United States Patent
Goebel et al.

(10) Patent No.: US 7,149,657 B2
(45) Date of Patent: Dec. 12, 2006

(54) METHOD, SYSTEM AND COMPUTER PRODUCT FOR ESTIMATING A REMAINING EQUIPMENT LIFE

(75) Inventors: Kai Frank Goebel, Ballston Lake, NY (US); Catherine Mary Graichen, Malta, NY (US); Michael Robert Dometita, Troy, NY (US)

(73) Assignee: General Electric Company, Niskayuna, NY (US)

( * ) Notice: Subject to any disclaimer, the term of this patent is extended or adjusted under 35 U.S.C. 154(b) by 623 days.

(21) Appl. No.: 10/602,465

(22) Filed: Jun. 23, 2003

(65) Prior Publication Data
US 2005/0005186 A1    Jan. 6, 2005

(51) Int. Cl.
G06F 17/00 (2006.01)

(52) U.S. Cl. .................. 702/183; 700/90; 700/108; 702/34; 702/181; 702/182; 702/184

(58) Field of Classification Search ............... 702/181, 702/182, 183, 184, 34; 700/90, 108
See application file for complete search history.

(56) References Cited

U.S. PATENT DOCUMENTS

| | | | | |
|---|---|---|---|---|
| 5,210,704 A | * | 5/1993 | Husseiny | 702/34 |
| 5,780,725 A |   | 7/1998 | Tanaka | |
| 5,842,212 A | * | 11/1998 | Ballurio et al. | 707/100 |
| 6,269,690 B1 | * | 8/2001 | Shimizu et al. | 73/146 |
| 6,278,920 B1 | * | 8/2001 | Hebberd | 701/29 |
| 6,408,258 B1 | * | 6/2002 | Richer | 702/182 |
| 6,829,515 B1 | * | 12/2004 | Grimm | 700/108 |
| 6,834,256 B1 | * | 12/2004 | House et al. | 702/181 |
| 2002/0107589 A1 | * | 8/2002 | Grimm | 700/90 |
| 2002/0143421 A1 | * | 10/2002 | Wetzer | 700/100 |
| 2002/0174384 A1 | * | 11/2002 | Graichen et al. | 714/37 |
| 2003/0135349 A1 | * | 7/2003 | Yoshie et al. | 702/183 |
| 2005/0033557 A1 | * | 2/2005 | House et al. | 702/184 |
| 2005/0143956 A1 | * | 6/2005 | Long et al. | 702/184 |

FOREIGN PATENT DOCUMENTS

| | | | |
|---|---|---|---|
| EP | 1160712 A2 | | 5/2001 |
| JP | 2000097815 A | * | 4/2000 |
| JP | 2003090868 A | * | 3/2003 |

OTHER PUBLICATIONS

M. Nelson and K. Mason, "A Model-Based Approach to Information Fusion". *Proc. Information, Decision, and Control*, pp. 395-400, 1999.

A. Loskiewicz-Buczak, R. Uhrig, "Decision Fusion by Fuzzy Set Operations", *Proc. third IEEE Conf. Fuzzy Systems*, vol. 2, pp. 1412-1417, 1994.

A. Rahman and M. Fairhurst, "Towards a Theoretical Framework for Multi-Layer Decision Fusion", *Proc. IEEE Third Europe. Workshop on Handwriting Analysis and Recognition*, pp. 7/1-7/7, 1998.

K. Goebel, *Architecture and Design of a Diagnostic Information Fusion Tool*, AIEDAM: special edition AI in Equipment Service, vol. 15 No. 4, pp. 335-348, 2001.

(Continued)

*Primary Examiner*—Carol S. W. Tsai
(74) *Attorney, Agent, or Firm*—Ann M. Agosti; Patrick K. Patnode

(57) ABSTRACT

A method, system and computer product for estimating a remaining equipment life is provided. Data are collected relating to the parameters. The data are stored and integrated. Then, the remaining equipment life is estimated using the integrated data.

21 Claims, 6 Drawing Sheets

OTHER PUBLICATIONS

A. M. Law, et al, "Simulation Modeling and Analysis", Third Edition, McGraw Hill Inc., NY, 2000, pp. 302-305.

P. Smets, et al, "What is Dempster-Shafer's Model", Advances in the Dempster-Shafer Theory of Evidence, 1994, pp. 5-34.

TR Gruber, "A Translation Approach to Portable Ontology Specifications", Knowledge Systems laboratory, Technical Report KSL 92-71, Sep. 1992, pp. 1-23.

MA Musen, "Dimensions of Knowledege Sharing and Reuse", Computers and Biomedical Research 25, 1992, pp. 435-467.

Deborah McGuiness, et al,"An Environment for Merging and Testing Large Ontologies" Principles of Knowledge Representation and Reasoning: Proceedings of the Seventh International Conference (KR2000), 2000, 11 pages.

* cited by examiner

Table 1: Age Weibull Values

| | Weibull Shape/Beta | Scale/Alpha | Sum Squared Errors | % w/in Conf. Limits |
|---|---|---|---|---|
| Comp 1 | 1.86 | 5343.54 | 8.52 | 84.25% |
| Comp 2 | 1.35 | 2231.85 | 5.85 | 90.27% |

Weibull Probability Plot (shape=1.8067, scale=5411.3749)

Table 2: Weibull Analysis

| Stress Variable | | SSE | % w/in Conf. Limits |
|---|---|---|---|
| Component 1 | Age | 8.52 | 84.25 % |
| | Adjusted Age | 5.24 | 95.86 % |
| Component 2 | Age | 5.85 | 90.27 % |
| | Adjusted Age | 1.45 | 100.00 % |

METHOD, SYSTEM AND COMPUTER PRODUCT FOR ESTIMATING A REMAINING EQUIPMENT LIFE

BACKGROUND OF THE INVENTION

The invention generally relates to estimating a remaining equipment life and more specifically to a method and system for estimating a remaining equipment life based on multiple parameters.

Equipment life estimates are usually performed for estimating a remaining equipment life and are also useful in the determination of the time to failure and reliability of equipment components. Typically, age based population distributions serve as a primary information source for estimating a remaining equipment life. In that case, the current age of the equipment is taken as an indication of the time to failure of the equipment. However, age based population distributions have considerable degrees of variability in their distribution which reduces the usefulness of the remaining equipment life estimates.

BRIEF DESCRIPTION OF THE INVENTION

One technique to address the need of determining a more refined estimate of the remaining equipment life is to integrate other (possibly heterogeneous) information sources that are potential indicators of the remaining equipment life.

In one embodiment, a method and computer readable medium for estimating a remaining equipment life based on a plurality of parameters is provided. Data relating to the plurality of parameters are collected. The data are stored and integrated. The integrated data are used to estimate the remaining equipment life.

In a second embodiment, a system for estimating a remaining equipment life based on a plurality of parameters is provided. The system comprises a data storage component configured to store data relating to the plurality of parameters, a data integration component configured to integrate the stored data and a life estimation component configured to estimate the remaining equipment life using the integrated data.

DETAILED DESCRIPTION OF THE INVENTION

Figure 1:
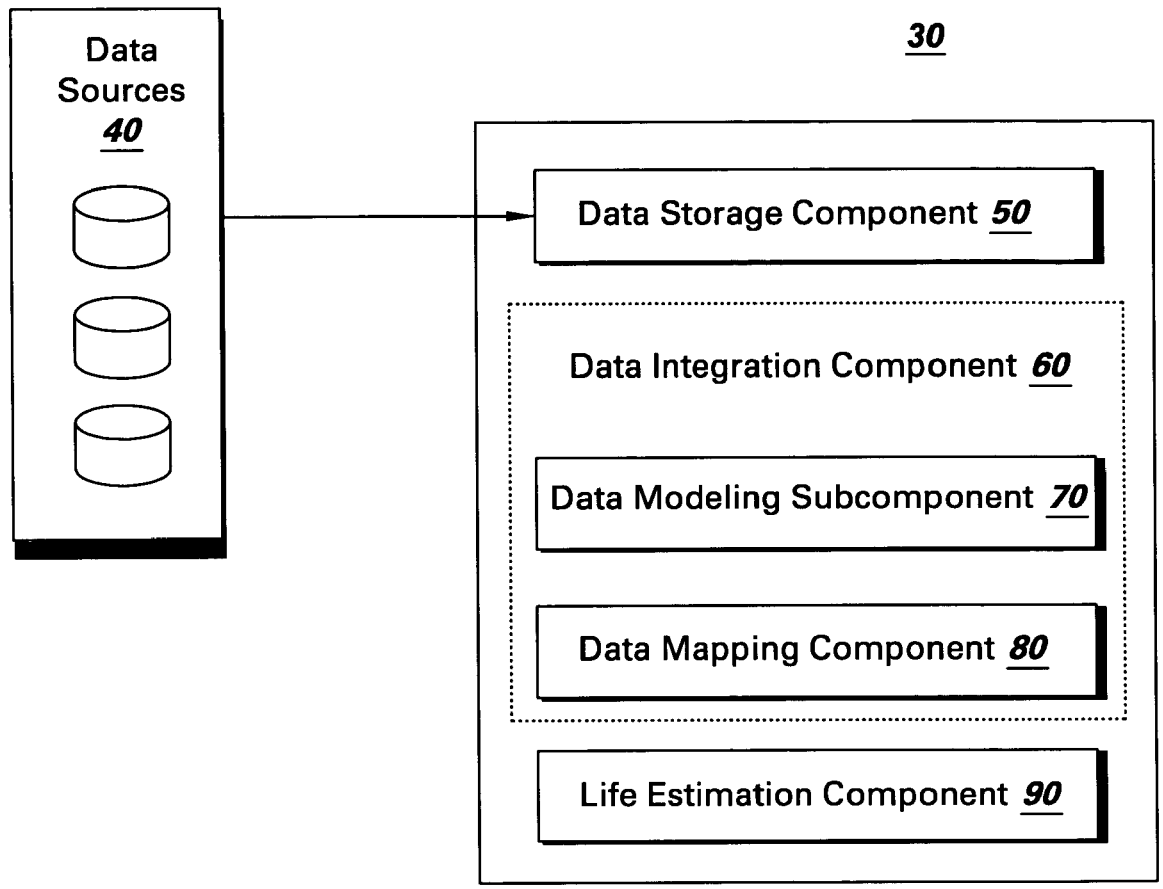
FIG. 1 illustrates a top-level component architecture diagram of an equipment life estimation system for estimating a remaining equipment life.

FIG. 1 illustrates a top-level component architecture diagram of an equipment life estimation system 30 for estimating a remaining equipment life. In accordance with one embodiment of the invention, system 30 comprises data sources 40, a data storage component 50, a data integration component 60 comprising a data modeling subcomponent 70 and a data mapping subcomponent 80 and a life estimation component 90. Each component is described in further detail below.

Figure 2:
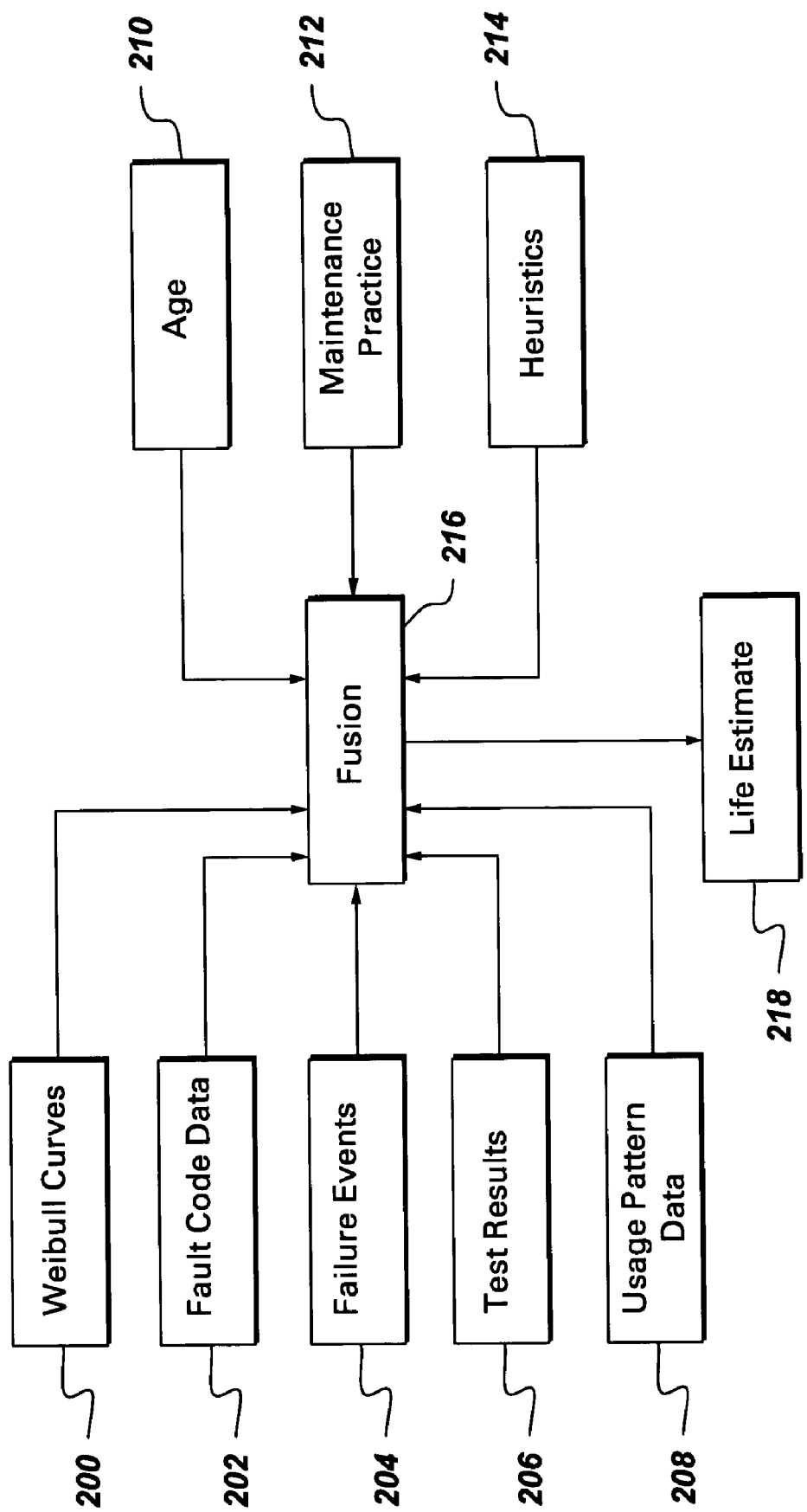
FIG. 2 is a block diagram illustrating the various data sources used by the equipment life estimation system of FIG. 1 in the estimation of the remaining equipment life.

Data sources 40 are used by the life estimation system 30 in the estimation of the remaining equipment life. An efficient method for estimating remaining equipment life would be to consider these various heterogeneous data sources of information in the estimation of the remaining equipment life. The data sources 40 comprise sources such as, for example, failure events, fault code data, usage pattern data, age data, test results, maintenance practices, Weibull curves and heuristics related to equipment components. In a specific embodiment of the invention, the data sources 40 comprise usage pattern data, fault code data and age data related to equipment components. FIG. 2 describes the data sources 40 used by the equipment life estimation system of FIG. 1 in further detail.

Continuing with reference to FIG. 1, the data storage component 50 is configured to store data received from data sources 40. In one embodiment, the data storage component is represented by a relational database of tables.

The data integration component 60 is configured to integrate the data stored in the data storage component 50. The data integration component 60 further comprises a data modeling subcomponent 70. The data modeling subcomponent 70 is configured to model a plurality of relationships relevant to a plurality of parameters represented by the data sources 40. The modeling comprises enumerating the data sources 40 stored in the data storage component 50, and modeling relationships between the parameters represented by the data sources. The data modeling subcomponent 70 categorizes the data sources 40 based on their common properties. Common properties comprise properties that are common to all equipment components and facilitate the comparison of the parameters represented by the heterogeneous data sources from a unified standpoint. In a specific embodiment of the invention, the common property is derived based on transforming or mapping the parameters represented by the data sources into an age adjustment state (indicative of an impact on a wear state) related to the equipment components. The categorization of the data sources 40 is accomplished using an ontological representation or other common representation mechanism of the data sources. The data integration component 60 further comprises a data mapping subcomponent 80. The data mapping subcomponent 80 is configured to determine a representation for the parameters in terms of a unified index indicative of the remaining equipment life. In a specific embodiment of the invention, the unified index is referred to as an age adjustment index. The age adjustment index corresponds to an age adjustment value for refinement of the remaining equipment life estimate. The basis for age adjustment is that the age of an equipment component can be adjusted or refined based on the wear that the equipment component is exposed to. That is, the knowledge about the wear state of an equipment component provides a more refined life estimate. In a more specific embodiment of the invention, the wear state is defined or specified in terms of the usage pattern data and fault code data parameters related to equipment components.

Figure 3:
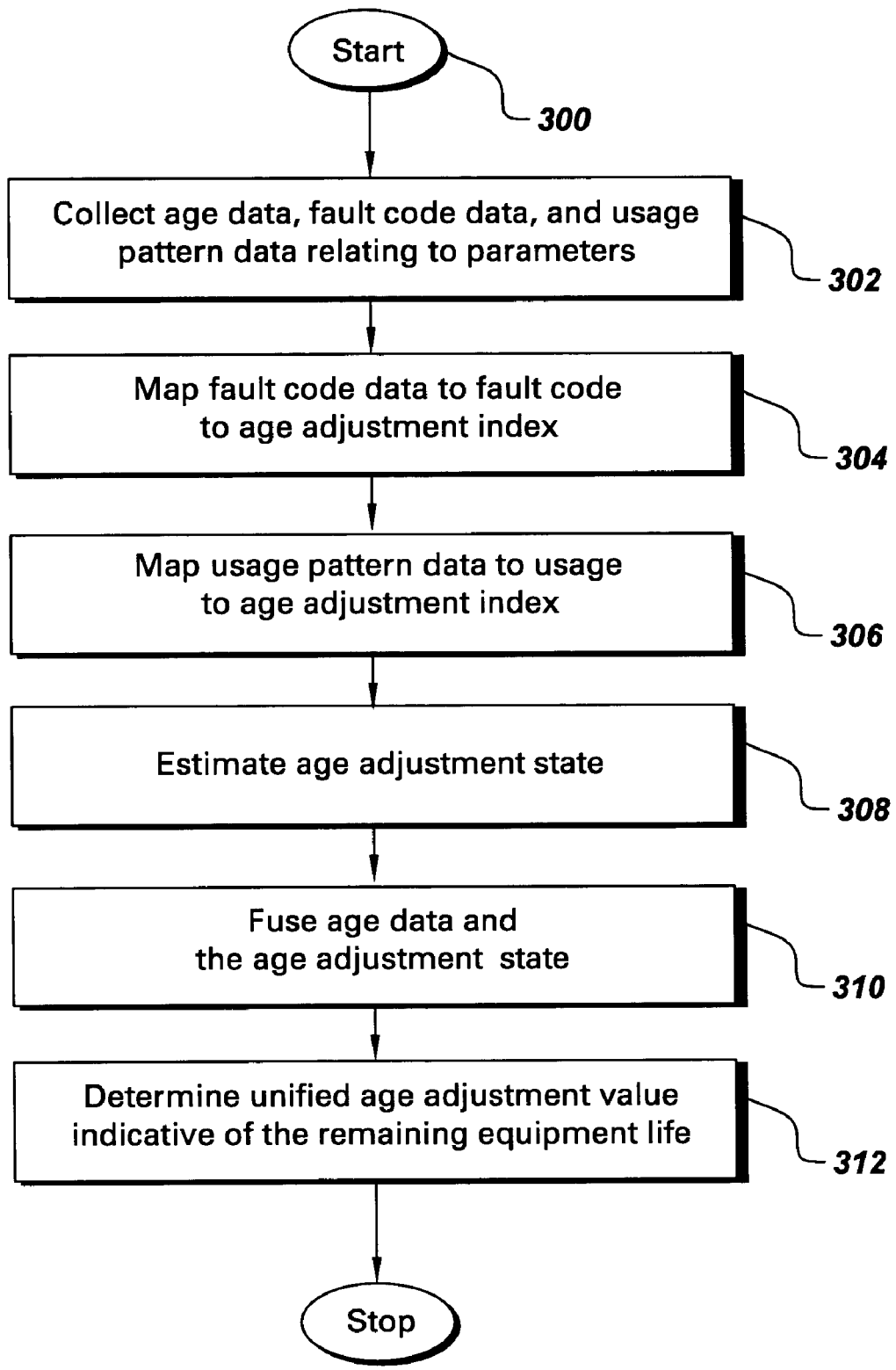
FIG. 3 is an illustrated embodiment of the steps performed by the equipment life estimation system of FIG. 1 to estimate the remaining equipment life.

The data mapping subcomponent 80 transforms or maps the parameters to the age adjustment index. The data mapping subcomponent 80 estimates the age adjustment state from the above transformations and fuses the age data related to the equipment component with the age adjustment state to arrive at a unified age adjustment value. The life estimation component 90 then estimates the remaining equipment life based on the unified age adjustment value. FIG. 3 describes in further detail the set of steps performed by the equipment life estimation system 30 to estimate the remaining equipment life. In a specific embodiment, the equipment life estimation system 30 is used to estimate the remaining life of vehicle or locomotive components. In a more specific embodiment, the locomotive components comprise the power assembly and turbo charger.

FIG. 2 is a block diagram illustrating the various data sources that may be used by the equipment life estimation system of FIG. 1 in the estimation of the remaining equipment life. The various data sources represent potential indicators or parameters in the estimation of the remaining equipment life and serve to determine a more refined remaining life estimate. A more refined life estimate that would enable limiting the use of equipment components that have high wear and high risk of failure and maximize the use of equipment components with low wear and lower failure risks and in turn improve the cost associated with maintenance operations for these equipment components. These data sources are compared from a unified standpoint and integrated.

The data sources comprise failure events 204, fault code data 202, usage pattern data 208, age data 210, test results 206, maintenance practices 212, Weibull curves 200 and heuristics 214. Failure events 204 provide information about the failure of specific equipment components. In one embodiment, an equipment component that has failed numerous times indicates exposure to severe wear. In another embodiment, fault code data 202 is indicative of heavy wear. Fault codes report information about component overload, component overheating, etc., indicative of the wear of the equipment component. Usage pattern data 208 provide information about specific load conditions subjected to by equipment components. Usage pattern data 208 also indicate the time duration for which an equipment component was subjected to a particular load and for how long. Information on age data 210 is an indicator for average wear of equipment components for a given age. Typically, component wear increases sharply at the beginning of its life, then settles to a more moderate wear slope, and increases again towards the end of its life. Weibull curves 200 provide information regarding equipment life distributions. Test results 206 report about specific wear related parameters such as dimensional changes or operational behavior acquired during inspections. Maintenance practices 212 indicate differences in maintenance practices among various equipment components that affect the wear. Heuristics 214 indicate experience-derived knowledge about a set of data sources that describes component behavior relating to wear in more complex relations using linguistic rules. The above various data sources are then fused together in step 216, in order to estimate the remaining equipment life in step 218. Step 216 is described in further detail in step 310 and step 218 is described in further detail in step 312.

One of ordinary skill in the art will recognize that the above listing of data sources is for illustrative purposes and is not meant to limit other types of data sources that can be used by the equipment life estimation system 30 in the estimation of the remaining equipment life.

FIG. 3 is an illustrated embodiment of the steps performed by the equipment life estimation system of FIG. 1 to estimate the remaining equipment life. As shown, the process starts in step 300 and then passes to step 302. Each step is described in further detail below.

In step 302, data related to the age, fault codes, and usage pattern parameters are collected from the data sources 40 and stored in the data storage component 50. The data storage component, represented by the relational database comprises fields and methods. The field and methods comprise information pertaining to specific equipment components. In one embodiment, the fields specify parameters, such as usage pattern data and fault code data related to the equipment component, that are to be stored in the database and the methods specify commands used to retrieve the data related to the parameters.

In step 304, the fault code data is mapped to a fault code to age adjustment index. In one embodiment of the invention, the mapping of fault code to age adjustment index comprises representing the fault code as the number of error messages or error log entries generated by the equipment. Error messages could be generated due to overheating of the equipment component, for example. The number of error messages is considered to be related to the impact on the wear of the equipment. The larger the number of error messages generated by the equipment, the larger is the impact on the wear, and hence the age adjustment index of the equipment.

In step 306, the usage pattern data is mapped to a usage to age adjustment index. In one embodiment of the invention, the mapping of usage to age adjustment index is based on the number of megawatt hours consumed by the equipment component and comprises representing the usage pattern data as a ratio of a weighted average of the time spent at a plurality of load settings relevant to the equipment component to the power value consumed by the equipment component. The plurality of load settings are indicative of a type and duration of a plurality of load conditions subjected to by the equipment component. An equipment component whose usage is high will have a larger impact on the wear, and hence the age adjustment index of the equipment.

In step 308, the age adjustment state is estimated from the fault code to age adjustment index and the usage to age adjustment index derived in steps 304 and 306 respectively. The estimating comprises calculating the fault code to age adjustment index and the usage to age adjustment index. The fault code to age adjustment index is calculated using a suitable nonlinear squashing function. One embodiment of this function is:

$$\text{age\_adjustment\_index}_{\text{error\_logs}} = 2\left(\frac{1}{1 + e^{-(\alpha_e \cdot \#\_\text{error\_logs} \cdot \beta_e)}} - 0.5\right) \quad (1)$$

Here, $\alpha_e$ scales the slope of the curve and is a tunable parameter and $\beta_e$ is a positional parameter, and is also tunable. Similarly, the usage pattern to age adjustment index is calculated using a suitable nonlinear squashing function. One embodiment of this function is:

$$\text{age\_adjustment\_index}_{\text{usage\_pattern}} = 2\left(\frac{1}{1+e^{-(\alpha_u \cdot \text{usage\_index} - \beta_u)}} - 0.5\right) \quad (2)$$

Here, $\alpha_u$ scales the slope of the curve and is a tunable parameter and $\beta_u$ is a positional parameter, and is also tunable.

The parameters $\alpha$ and $\beta$ are used to tune the mapping equations (1) and (2). The tuning comprises using a suitable optimization function. One embodiment of an optimization function is a genetic algorithm that determines the set of parameters based on a fitness function such as the sum-squared error and the percentage of data points within a pre-defined confidence interval. In one embodiment of the invention, a 95% confidence interval of the Weibull curve is used in the fitness function. Equations (1) and (2) are derived based on standard non-linear squashing functions. Non-linear squashing functions are made use of in machine learning methods such as neural networks. Non-linear squashing functions are monotonically increasing functions that take as input, values between $-\infty$ and $+\infty$ and return values in a finite interval. The mapping equations (1) and (2) take quantified inputs such as usage in megawatt hours consumed or number of error log entries and return a continuous number between $-1$ and $+1$ representing the age adjustment index, as output.

Continuing with the flow chart of FIG. 3, in step 310, the age data of the equipment is fused with the age adjustment state derived from the equations (1) and (2) of step 308. The fusion results in the determination of a unified age adjustment value. Various strategies exist to accomplish the fusion in step 310. The fusion uses an aggregation technique to estimate the remaining equipment life. In one embodiment of the invention, the fusion technique used is a linear aggregation technique. In another embodiment, the fusion technique used is a non-linear aggregation technique. Different weights are assigned to the calculated age adjustment indices of step 308. Then the age adjustment state, comprising the weighted age adjustment indices, is fused with the age data to determine a unified age adjustment value. The fusion computes a weighted sum of the age data and the age adjustment state. In step 312, a unified age adjustment value indicative of the remaining equipment life is determined using the following equation:

$$\text{unified\_age\_adjustment\_value} = \text{age} + C2 * \text{age\_adjustment\_index}_{\text{usage\_pattern}} + C3 * \text{age\_adjustment\_index}_{\text{error\_logs}} \quad (3)$$

Here, $C2*\text{age\_adjustment\_index}_{\text{usage\_pattern}}$ and $C3*\text{age\_adjustment\_index}_{\text{error\_logs}}$ represent the weighted age adjustment indices, respectively. The weights C2 and C3 indicate a degree of emphasis placed on each of the weighted age adjustment indices. C2 and C3 are tuned using a suitable optimization function. One embodiment of an optimization function is a genetic algorithm that determines the set of parameters based on a fitness function such as the sum-squared error and the percentage of data points within a pre-defined confidence interval. In one embodiment of the invention, a 95% confidence interval of the Weibull curve is used in the fitness function.

The following figures illustrate the Weibull curves derived for equipment components in one embodiment of the invention. Weibull distributions are generally used to model various life distributions and in the determination of reliability of equipment components. Reliability is defined as the probability of failure of an equipment component at a specified period of time. In a specific embodiment of the invention, Weibull distributions are used to model the reliability and time to failure for the equipment components.

Figure 4:
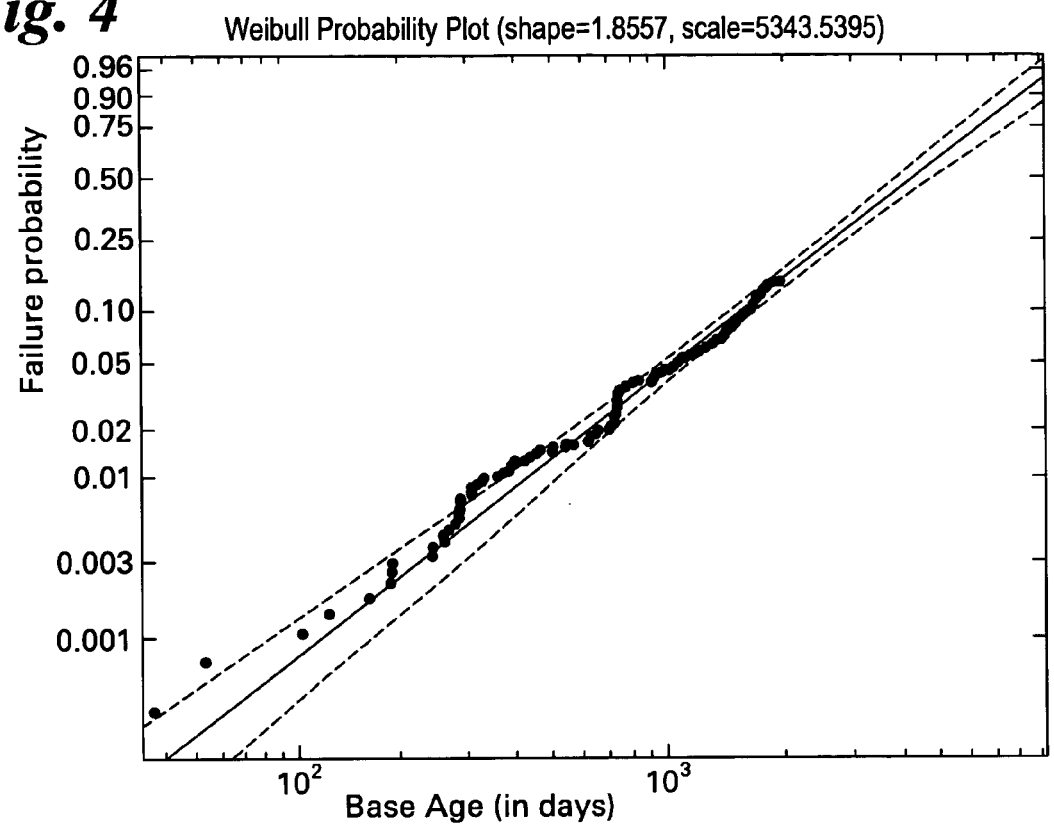
FIGS. 4–5 are graphs illustrating Weibull curves derived for two equipment components using a base equipment age.
Figure 5:
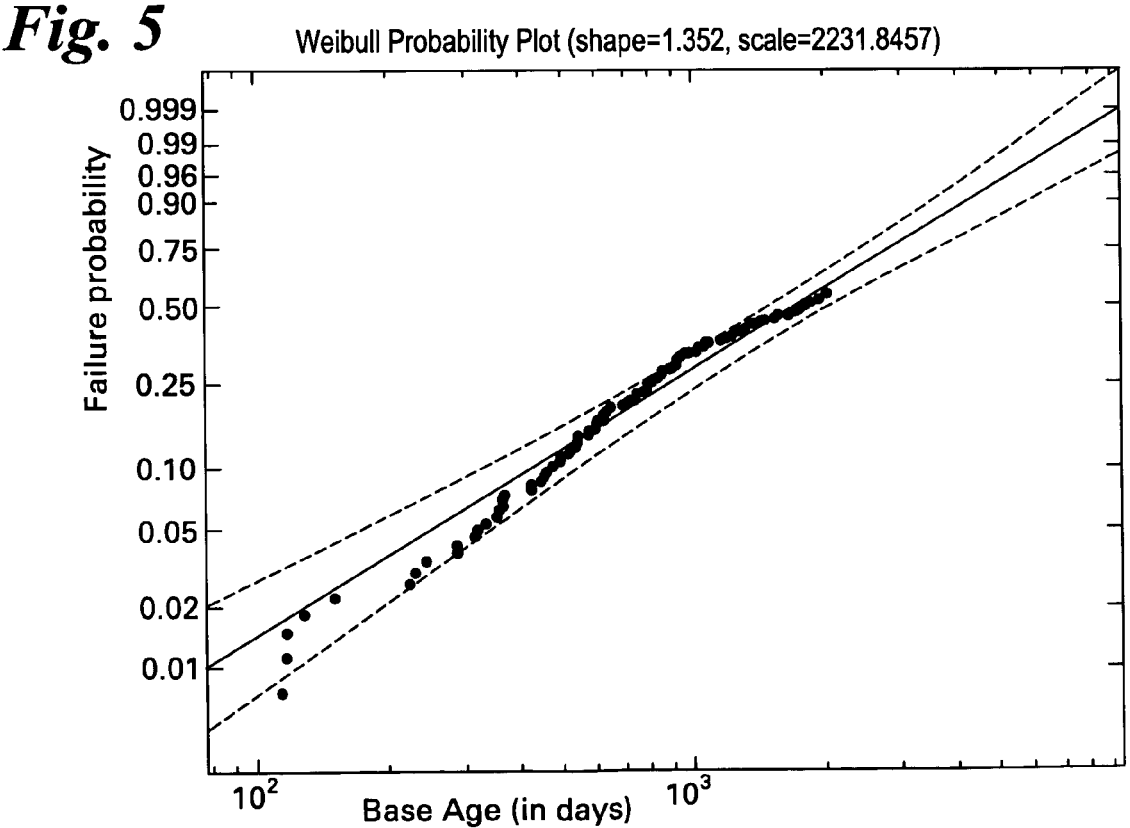

FIGS. 4-5 are graphs illustrating the Weibull curves derived for two equipment components using a base equipment age. Individual data points on the graphs represent the age data of the components. The solid line represents the Weibull estimate for the probability of failure (y axis) at the corresponding age in days (x axis). The dotted lines on either side of the solid line represent the 95% confidence bounds for the range of probabilities for that age. Both x and y-axes are represented on a log10 scale. Visual inspection of FIGS. 6-7 indicate that the data points follow the Weibull curve more closely after the first year. For this specific data set, there is a larger deviation from the Weibull estimate for failures within a year.

It must be appreciated that the Weibull curves of FIGS. 4-5 are obtained using only the age of the equipment component as a basis for life estimation. However, usage pattern data for equipment components, for example, mileage, hours in use, cycles and starts are generally not similar across all equipment components. Usage pattern data vary considerably over time and across equipment components. Similarly, as mentioned above, other factors may contribute to the rate of wear of equipment components, such as operation under abnormal conditions, variations in maintenance practices, or variations of environmental conditions.

Figures 6, 7:
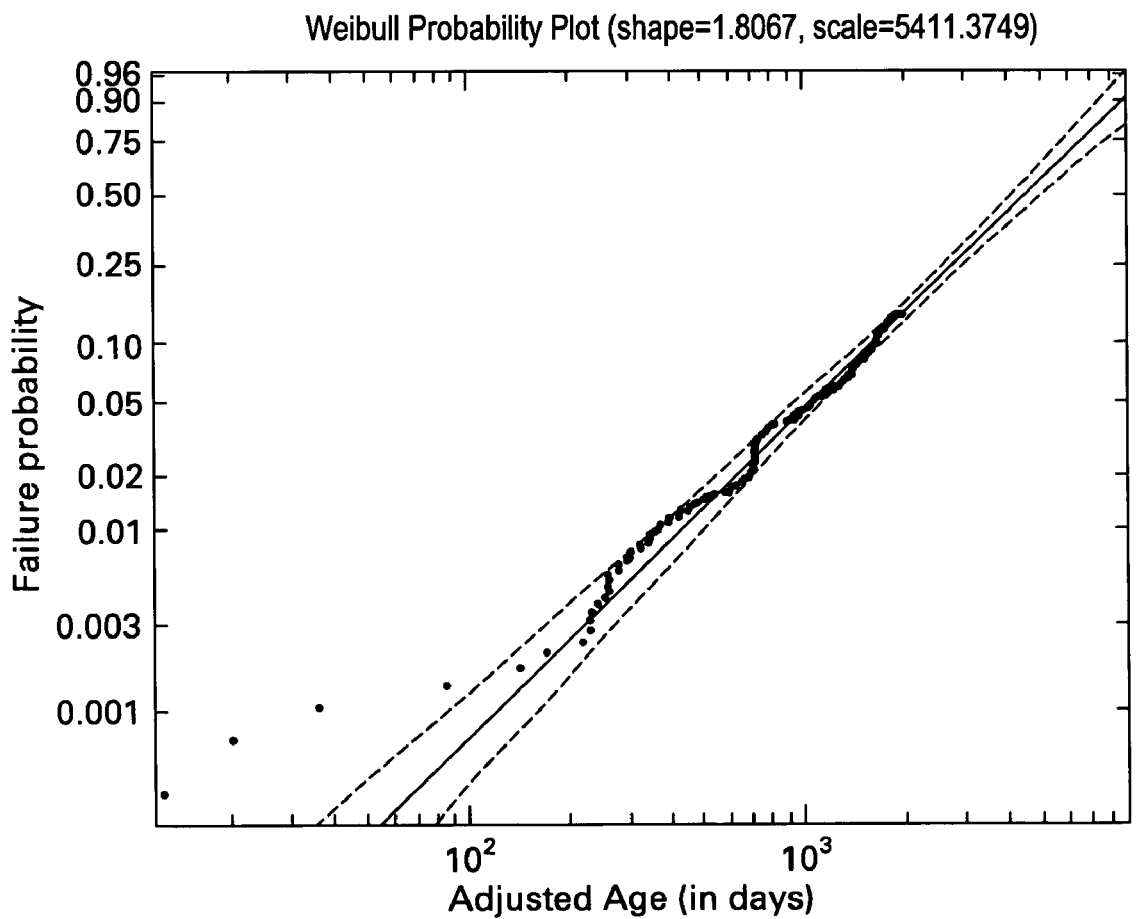
FIG. 6 is a table illustrating the goodness of fit of the graphs in FIGS. 4–5.
FIGS. 7–8 are graphs illustrating Weibull curves derived for two equipment components based on a unified age adjustment value.

FIG. 6 is a table illustrating the goodness of fit of the graphs in FIGS. 4-5. The metrics used are the sum squared errors (SSE) and the percentage of data points located within the calculated 95% confidence limits. The SSE is a cumulative measure of how much distance there was between each individual data point and the Weibull model.

Figures 8, 9:
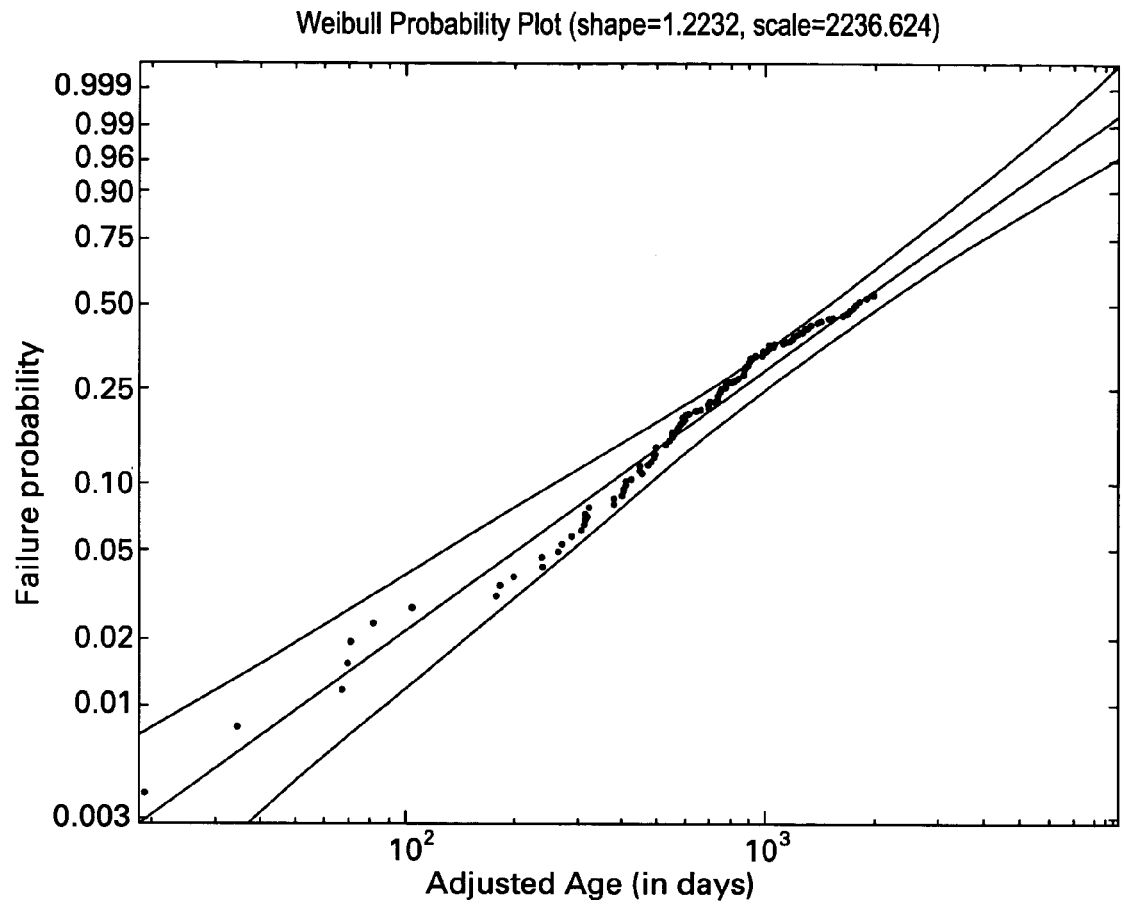
FIG. 9 is a table illustrating the comparison of the goodness of fit of the graphs of FIGS. 4–5 vs. the graphs in FIGS. 7–8.

FIGS. 7-8 are graphs illustrating the Weibull curves derived for two equipment components based on the unified age adjustment value. The graphs indicate that the Weibull fit produced for the age adjustment value of both the components provide a closer, smoother fit than the ones for the base age Weibull fit derived in FIGS. 4-5. A Weibull fitting that is more accurate has tighter confidence bounds and is a better predictor of life remaining for a component. This suggests that the adjusted equipment age is a better predictor and provides a more refined estimate of the equipment age. This can in turn improve the explanation of historical failures of equipment components.

FIG. 9 is a table illustrating the comparison of the goodness of fit of the graphs of FIGS. 4-5 vs. the graphs in FIGS. 7-8. The stress variable represents the wear of the equipment component. The results from the table also indicate that the Weibull fit produced based on the unified age adjustment value of both the equipment components provide a closer, smoother fit than the ones for the base age Weibull fit.

The foregoing flow charts and block diagrams of the invention show the functionality and operation of the equipment life estimation system 30. In this regard, each block/component represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added. Furthermore, the functions can be implemented in programming languages such as C++ or JAVA; however, other languages can be used such as Perl, JavaScript and Visual Basic.

The various embodiments described above comprise an ordered listing of executable instructions for implementing logical functions. The ordered listing can be embodied in any computer-readable medium for use by or in connection with a computer-based system that can retrieve the instructions and execute them. In the context of the application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The embodiments described above have several advantages, including the ability to integrate heterogeneous information sources that are potential parameters in the estimation of the remaining equipment life. Also, the Weibull distributions based on the unified age adjustment value indicate a closer and smoother Weibull distribution fit. A closer fit, in turn, reduces the variability of the Weibull curve and provides a better, more refined life estimate for equipment components.

It is apparent that there has been provided, a method, system and computer product for estimating a remaining equipment life based on a plurality of parameters. While the invention has been particularly shown and described in conjunction with a preferred embodiment thereof, it will be appreciated that variations and modifications can be effected by a person of ordinary skill in the art without departing from the scope of the invention.

The invention claimed is:

1. A method for estimating a remaining equipment life based on a plurality of parameters comprising:
    collecting data relating to the plurality of parameters;
    storing the data;
    integrating the stored data, wherein the integrating comprises determining a representation for at least one of the plurality of parameters in terms of a unified index indicative of the remaining equipment life and mapping the at least one of the plurality of parameters to the unified index to generate at least one mapped parameter; and
    estimating the remaining equipment life using the integrated data.

2. The method of claim 1, wherein the plurality of parameters comprise at least two of usage data, fault code data and age data.

3. The method of claim 1, wherein the plurality of parameters are selected from the group consisting of usage data, fault code data, age data, failure modes for subcomponents, test results, failure modes and effect analysis, maintenance practice, heuristics, and replacement parts information.

4. The method of claim 1, further comprising, prior to integrating, modeling a plurality of relationships relevant to the plurality of parameters to generate a plurality of modeled relationships, wherein integrating the stored data comprises integrating the plurality of modeled relationships.

5. The method of claim 1, wherein the mapping further comprises fusing the at least one mapped parameter with at least one other mapped parameter to estimate the remaining equipment life.

6. The method of claim 1, wherein the mapping further comprises fusing the at least one mapped parameter with at least one other unmapped parameter to estimate the remaining equipment life.

7. The method of claim 5, wherein the fusing comprises using an aggregation technique to estimate the remaining equipment life.

8. The method of claim 1, further comprising generating a life estimate curve for the equipment based on the unified index, wherein the curve is a model from which the remaining equipment life can be derived.

9. A system for estimating a remaining equipment life based on a plurality of parameters comprising:
    a data storage component configured to store data relating to the plurality of parameters;
    a data integration component configured for integrating the stored data, wherein the data integration component comprises a data modeling subcomponent configured to model a plurality of relationships relevant to the plurality of parameters to generate a plurality of modeled relationships, wherein integrating the stored data comprises integrating the plurality of modeled relationships; and
    a life estimation component configured to estimate the remaining equipment life using the integrated data.

10. The system of claim 9, wherein the plurality of parameters comprise at least two of usage data, fault code information and age.

11. The system of claim 9, wherein the plurality of parameters are selected from the group consisting of usage data, fault code data, age data, failure modes for subcomponents, test results, failure modes and effect analysis, maintenance practice, heuristics, and replacement parts information.

12. The system of claim 9, wherein the data integration component further comprises a data mapping subcomponent configured to determine a representation for at least one of the plurality of parameters in terms of a unified index indicative of the remaining equipment life.

13. The system of claim 12, wherein the data mapping subcomponent is further configured to map the at least one of the plurality of parameters to the unified index, to generate at least one mapped parameter.

14. The system of claim 13 wherein the data mapping subcomponent is further configured to fuse the at least one mapped parameter with at least one other mapped parameter to estimate the remaining equipment life.

15. The system of claim 13, wherein the data mapping subcomponent is further configured to fuse the at least one mapped parameter with at least one other unmapped parameter to estimate the remaining equipment life.

16. The system of claim 12, wherein the system is further configured to use a linear aggregation technique to estimate the remaining equipment life.

17. The system of claim 12 is further configured to generate a life estimation curve for the equipment based on the unified index, wherein the curve is a model from which the remaining equipment life can be derived.

18. A computer-readable medium storing computer instructions for instructing a computer system to estimate a remaining equipment life based on a plurality of parameters, the computer instructions comprising:
   collecting data relating to the plurality of parameters;
   storing the data;
   integrating the stored data, wherein the integrating comprises instructions for determining a representation for at least one of the plurality of parameters in terms of a unified index indicative of the remaining equipment life, wherein the integrating further comprises instructions for mapping the at least one of the plurality of parameters to the unified index, to generate at least one mapped parameter; and
   estimating the remaining equipment life using the integrated data.

19. The computer-readable medium of claim 18, wherein the plurality of parameters comprise at least two of usage data, fault code information and age.

20. The computer-readable medium of claim 18, wherein the mapping further comprises instructions for fusing the at least one mapped parameter with at least one other mapped parameter or unmapped parameter to estimate the remaining equipment life.

21. The computer-readable medium of claim 18 further comprising instructions for generating a life estimation curve for the equipment based on the unified index, wherein the curve is a model from which the remaining equipment life can be derived.

* * * * *